J. Q. BLACK.
CHEESE-PRESERVER.
No. 170,223. Patented Nov. 23, 1875.
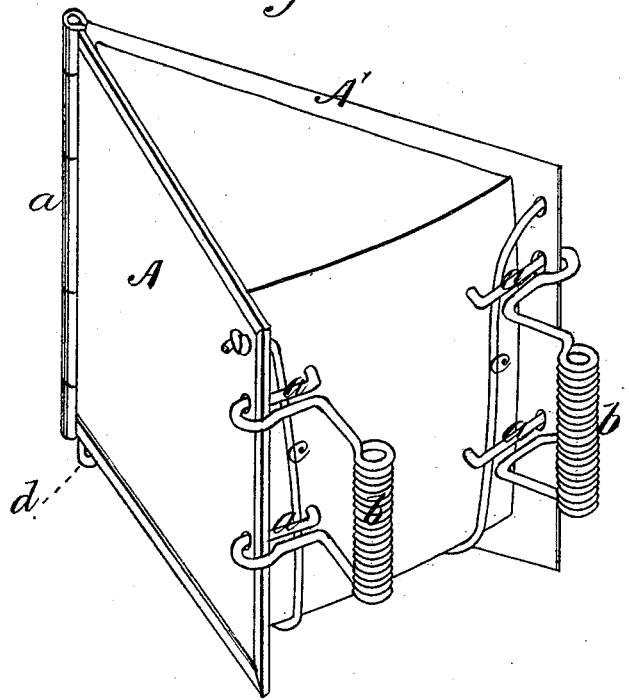
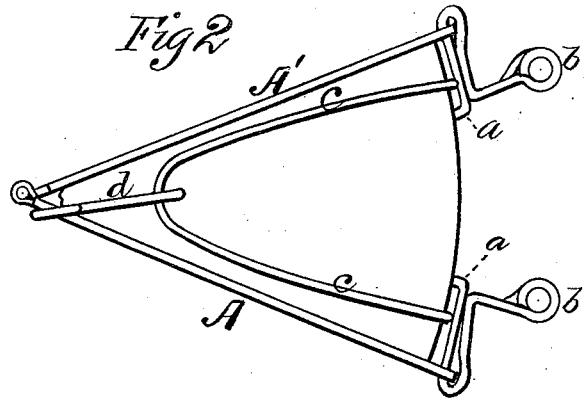

UNITED STATES PATENT OFFICE.

JOHN Q. BLACK, OF SEXTONVILLE, WISCONSIN.

IMPROVEMENT IN CHEESE-PRESERVERS.

Specification forming part of Letters Patent No. 170,223, dated November 23, 1875; application filed April 3, 1875.

*To all whom it may concern:*

Be it known that I, JOHN Q. BLACK, of Sextonville, in the county of Richland and State of Wisconsin, have invented a new and valuable Improvement in Cheese-Preservers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my device, and Fig. 2 is a plan view of the same.

This invention has relation to devices for preventing the freshly-cut edges of cheeses from becoming dried from exposure to the air, and cracking in consequence thereof; and the nature of the invention consists in the novel construction and arrangement of the parts, as will be hereinafter more fully set forth.

In the annexed drawings, A A' designate two metallic plates, in the form of a parallelogram, which are hinged together at $a$, as shown in Fig. 1. These plates are preferably of metal or glass; but they may be made of a close-grained wood, or of any wood which may have been rendered impermeable to air by a suitable coating of varnish, or by any other available means. The outer vertical edges of these plates are provided with hooks $a$, pivoted thereto in any suitable manner, which are adapted to be thrust into the cheese and disengaged therefrom by means of an actuating-handle, $b$.

When the cheese is newly cut plates A are inserted into the gap, hinged edge foremost, and a preferably elastic cord, $c$, connecting the free vertical edges of the said plates, is passed around the periphery of the cheese, holding the plates snugly and forcibly up against the freshly-cut surfaces thereof, effectually preventing the evaporation of the moisture therefrom; but when the cheese has been reduced by successive cuttings therefrom to a wedge-like form the plates are caused to inclose the wedge, are forcibly compressed, and hooks $a$ are thrust into the rounding edges of the cheese, as shown in Fig. 1. Cord $c$ is then passed down and under the cheese, and is engaged into a pivotal center hook, $d$, which latter is then thrust into the body of the cheese, as shown in Fig. 2. By this means cord $c$ is kept out of the way, and is made to assist materially in supporting the block.

It will be seen from the above description that, being covered, the freshly-cut edges will at all times retain their moisture, and consequently are not liable to become cracked and seamed; also, that it will be impossible that these edges should be fly-blown or get covered with dust; hence the dealer will always be protected against loss of weight from evaporation, and his goods will at all times present a neat and attractive appearance.

I am well aware that a cheese-preserver having plates hinged together, and adapted to be secured upon the freshly-cut edges of a cheese, are not new, and I therefore do not claim such invention.

What I claim as new, and desire to secure by Letters Patent, is—

The combination of the hinged plates A A', hook $d$, and an elastic cord, $c$, connecting the free vertical edges of the said plate, substantially as and for the purpose specified.

In testimony that I claim the above I have hereunto subscribed my name in the presence of two witnesses.

JOHN Q. BLACK.

Witnesses:
CHAS. G. LAMBERSON,
H. H. BARNARD.